United States Patent
Shin et al.

(10) Patent No.: US 11,418,494 B2
(45) Date of Patent: Aug. 16, 2022

(54) ELECTRONIC DEVICE FOR SUPPORTING BACKUP AND REINSTALLATION OF MOBILE CARD

(71) Applicant: Samsung Electronics Co., Ltd, Suwon-si (KR)

(72) Inventors: Jun Kyoung Shin, Gumi-si (KR); Jong Hwan Kim, Yongin-si (KR); Sung Jun Kim, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 369 days.

(21) Appl. No.: 16/137,220

(22) Filed: Sep. 20, 2018

(65) Prior Publication Data

US 2019/0089685 A1 Mar. 21, 2019

(30) Foreign Application Priority Data

Sep. 20, 2017 (KR) .................. 10-2017-0121365

(51) Int. Cl.
*H04L 9/40* (2022.01)
*G06F 11/14* (2006.01)
(Continued)

(52) U.S. Cl.
CPC ...... *H04L 63/0435* (2013.01); *G06F 11/1451* (2013.01); *G06F 12/14* (2013.01);
(Continued)

(58) Field of Classification Search
CPC ............ H04L 63/0435; H04L 63/0485; H04L 63/0492; H04L 63/083; G06Q 20/3223;
(Continued)

(56) References Cited

U.S. PATENT DOCUMENTS 9,832,172 B2 11/2017 Smith et al.
10,037,248 B2 7/2018 Jeon et al.
(Continued)

FOREIGN PATENT DOCUMENTS

KR 10-2004-0079166 A 9/2004
KR 10-2009-0111520 A 10/2009
(Continued)

OTHER PUBLICATIONS

Notification of Reason for Refusal dated Dec. 27, 2021, in connection with Korean Application No. 10-2017-0121365, 19 pages.

*Primary Examiner* — Mohammad A. Nilforoush
*Assistant Examiner* — Wodajo Getachew

(57) ABSTRACT

An electronic device includes a communication circuit that communicates with a server for issuing a mobile card, a secure element that stores the mobile card, a memory, and a processor that is electrically connected to the communication circuit, the secure element, and the memory, wherein the processor receives personal data required for authentication of a user corresponding to the mobile card and card data required for payment by the mobile card through the communication circuit from the server when the mobile card is provisioned, and stores, in the secure element, backup data including the personal data and the card data for backing up the mobile card.

16 Claims, 11 Drawing Sheets

(51) Int. Cl.

| | |
|---|---|
| *G06Q 20/36* | (2012.01) |
| *G06Q 20/40* | (2012.01) |
| *G06Q 20/32* | (2012.01) |
| *H04W 12/30* | (2021.01) |
| *H04W 12/40* | (2021.01) |
| *H04W 12/02* | (2009.01) |
| *G06F 21/31* | (2013.01) |
| *H04W 12/033* | (2021.01) |
| *G06Q 20/34* | (2012.01) |
| *G06Q 20/38* | (2012.01) |
| *G06F 12/14* | (2006.01) |
| *G06F 21/77* | (2013.01) |

(52) U.S. Cl.
CPC ........... *G06F 21/77* (2013.01); *G06Q 20/322* (2013.01); *G06Q 20/3227* (2013.01); *G06Q 20/353* (2013.01); *G06Q 20/3552* (2013.01); *G06Q 20/36* (2013.01); *G06Q 20/382* (2013.01); *H04L 63/0492* (2013.01); *H04W 12/30* (2021.01); *H04W 12/40* (2021.01); *G06F 11/1453* (2013.01); *G06F 11/1464* (2013.01); *G06F 21/31* (2013.01); *G06Q 20/3223* (2013.01); *H04L 63/0485* (2013.01); *H04L 63/083* (2013.01); *H04W 12/02* (2013.01)

(58) Field of Classification Search
CPC .............. G06Q 20/3227; G06Q 20/36; G06Q 20/40145; G06F 11/1453; G06F 11/1464; G06F 21/31; G06F 21/77; H04W 12/40; H04W 12/30; H04W 12/033; H04W 12/02
USPC .......................................................... 705/76
See application file for complete search history.

(56) References Cited

U.S. PATENT DOCUMENTS

| | | | |
|---|---|---|---|
| 10,044,510 B2 | 8/2018 | Kwon et al. | |
| 2009/0048978 A1* | 2/2009 | Ginter | G07F 9/026 705/51 |
| 2012/0172089 A1* | 7/2012 | Bae | G06Q 20/354 455/558 |
| 2012/0271380 A1* | 10/2012 | Roberts | H04L 63/068 607/60 |
| 2014/0089666 A1* | 3/2014 | Kim | H04L 9/12 713/170 |
| 2015/0227932 A1* | 8/2015 | Huxham | G06Q 20/3821 705/76 |
| 2015/0301897 A1* | 10/2015 | Jeon | H04W 8/00 707/640 |
| 2019/0392019 A1* | 12/2019 | Brannon | G06F 16/951 |

FOREIGN PATENT DOCUMENTS

| | | |
|---|---|---|
| KR | 10-2011-0103822 A | 9/2011 |
| KR | 10-2011-0129068 A | 12/2011 |
| KR | 10-2013-0108443 A | 10/2013 |
| KR | 10-2014-0069596 A | 6/2014 |
| KR | 10-2016-0058375 A | 5/2016 |
| KR | 10-2016-0101635 A | 8/2016 |
| KR | 10-1648506 B1 | 8/2016 |
| WO | 2012/091351 A2 | 7/2012 |

* cited by examiner

ELECTRONIC DEVICE FOR SUPPORTING BACKUP AND REINSTALLATION OF MOBILE CARD

CROSS-REFERENCE TO RELATED APPLICATIONS AND CLAIM OF PRIORITY

This application is based on and claims priority under 35 U.S.C. § 119 to Korean Patent Application No. 10-2017-0121365 filed on Sep. 20, 2017 in the Korean Intellectual Property Office, the disclosure of which is incorporated by reference herein its entirety.

BACKGROUND

1. Field

The present disclosure relates to a technology for backing up a mobile card installed into an electronic device.

2. Description of Related Art

An electronic device may support various communication schemes such as near field communication (NFC), wireless LAN (WLAN), BT, ZigBee, Z-Wave, ultra-wide band (UWB), ultra-narrow band (UNB), wireless USB, wireless gigabit (WiGig), Bluetooth low energy (BLE), WirelessHD, TranferJet, Wireless FireWire, magnetic secure transmission (MST), and the like. The electronic device may apply the above-described communication schemes to various fields.

The electronic device may perform card payment and/or user authentication by using one of the communication schemes described above. For example, the electronic device may perform card payment by using a wallet application of a card issuer and may perform the function of an employee identification card or a pass card.

The electronic device may install a wallet application and access a server of a service provider by using the wallet application, thereby getting a mobile card. The electronic device may store the mobile card in a secure element in the form of an applet by using a card issuer server, a trusted service manager (TSM), a key management system (KMS), and the like.

The above information is presented as background information only to assist with an understanding of the present disclosure. No determination has been made, and no assertion is made, as to whether any of the above might be applicable as prior art with regard to the present disclosure.

SUMMARY

Since the mobile card is stored in the secure element of the electronic device, when backup and restoration functions are executed in the electronic device, the mobile card may not be backed up or restored. Thus, when replacing the electronic device, the user of the electronic device may have to reinstall the mobile card in a new electronic device. Since the installation process of the mobile card may be complicated and the user may use multiple mobile cards, the re-installation of the mobile card may discourage some users from replacing the electronic device. In addition, when a prepaid card (e.g., a transportation card) is re-installed, the balance information on the prepaid card may not be restored.

Aspects of the present disclosure are to address at least the above-mentioned problems and/or disadvantages and to provide at least the advantages described below. Accordingly, certain embodiments according to the present disclosure provide a user with a scheme that is capable of simplifying the process of reinstalling a mobile card when an electronic device is replaced.

In accordance with embodiments according to the present disclosure, there is provided an electronic device which includes a communication circuit that communicates with a server for issuing a mobile card, a secure element that stores the mobile card, a memory, and a processor that is electrically connected to the communication circuit, the secure element, and the memory, wherein the processor receives personal data required for authentication of a user corresponding to the mobile card and card data required for payment by the mobile card through the communication circuit from the server when the mobile card is provisioned, and stores, in the secure element, backup data including the personal data and the card data for backing up the mobile card.

In accordance with some embodiments according to the present disclosure, there is provided an electronic device which includes a communication circuit that communicates with a server for issuing a mobile card, a secure element that stores the mobile card, a memory including a secure zone, and a processor that is electrically connected to the communication circuit, the secure element, and the memory, wherein the processor obtains personal data required for authentication of a user corresponding to the mobile card and card data required for payment by the mobile card from backup data stored in the secure element for backup of the mobile card in response to a request of a user of the electronic device, and stores the personal data and the card data in the secure zone of the memory.

In some embodiments according to the present disclosure, there is provided an electronic device that includes a communication circuit that communicates with a server for issuing a mobile card, a secure element, a memory including a secure zone, and a processor electrically connected to the communication circuit, the secure element, and the memory, wherein the processor stores encrypted data received from another electronic device in the secure zone of the memory, receives personal data required for authentication of a user corresponding to the mobile card and card data required for payment by the mobile card by decrypting the encrypted data, generates the mobile card based on the personal data and the card data, and stores the mobile card in the secure element.

According to various embodiments of the present disclosure, by storing backup data in the secure element when provisioning a mobile card, the process of reinstalling a mobile card may be simplified.

In addition, by encrypting data using a password and using the secure zone of the memory and the processor, security may be maintained when the mobile card is reinstalled.

In addition, various effects that are directly or indirectly understood through the present disclosure may be provided.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, obj ect code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

With regard to description of drawings, similar elements may be marked by similar reference numerals.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure.

Figure 1:
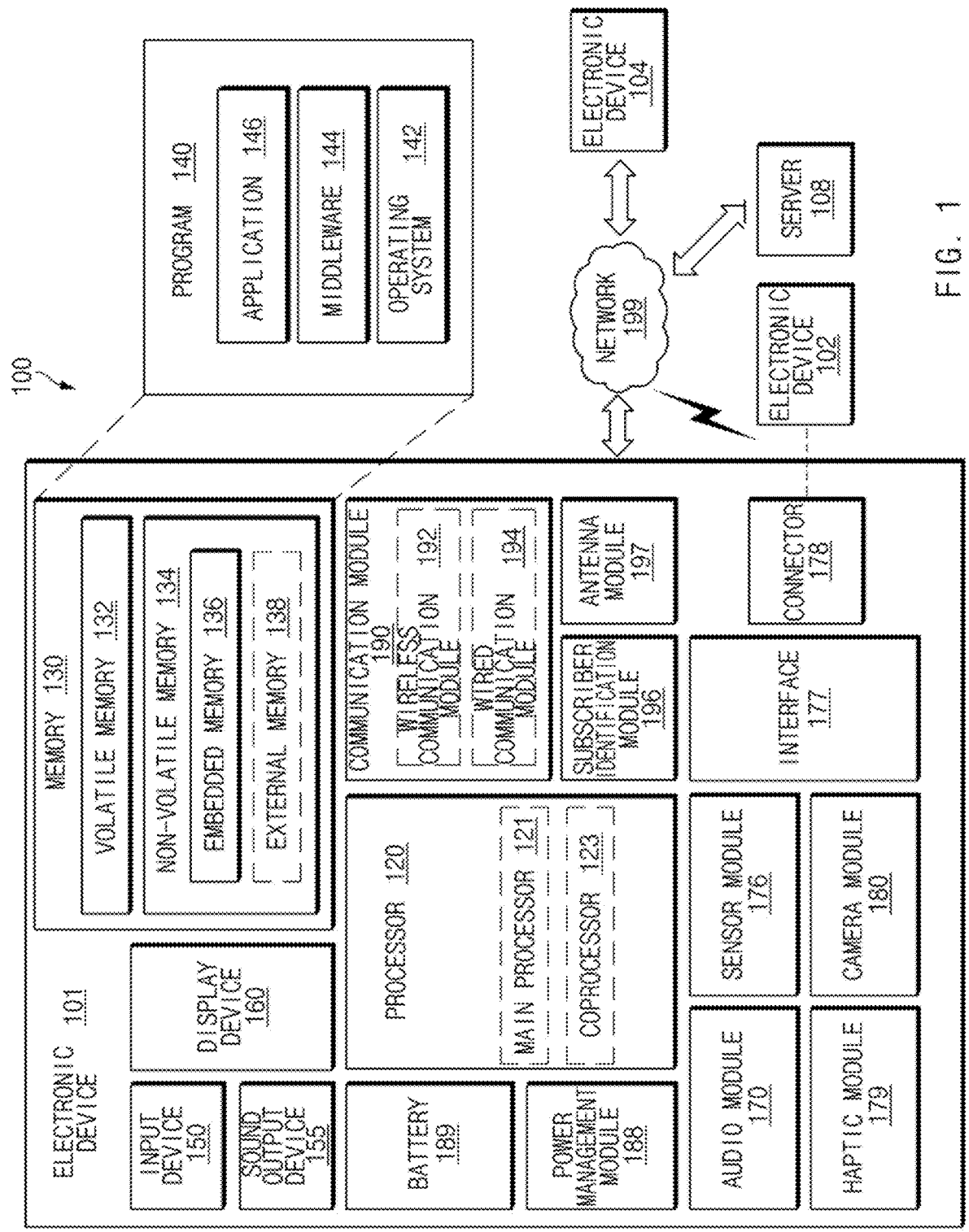
FIG. 1 illustrates, in block diagram format, an electronic device in a network environment according to certain embodiments.

FIG. 1 illustrates, in block diagram format, an electronic device 101 in a network environment 100 according to various embodiments. Referring to the non-limiting example of FIG. 1, the electronic device 101 may communicate with an electronic device 102 through a first network 198 (e.g., a short-range wireless communication) or may communicate with an electronic device 104 or a server 108 through a second network 199 (e.g., a long-distance wireless communication) in the network environment 100. According to various embodiments, the electronic device 101 may communicate with the electronic device 104 through the server 108. According to certain embodiments, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. According to some embodiments, at least one (as non-limiting examples, the display device 160 or the camera module 180) component of the electronic device 101 may be omitted or other components may be added to the electronic device 101. According to some embodiments, some components may be integrated and implemented as in the case of the sensor module 176 (e.g., a fingerprint sensor, an iris sensor, or an illuminance sensor) embedded in the display device 160 (e.g., a display).

The processor 120 may operate, for example, software (e.g., a program 140) to control at least one of other components (e.g., a hardware or software component) of the electronic device 101 connected to the processor 120 and may process and compute a variety of data. The processor 120 may load a command set or data, which is received from other components (e.g., the sensor module 176 or the communication module 190), into a volatile memory 132, may process the loaded command or data, and may store result data into a nonvolatile memory 134. According to some embodiments, the processor 120 may include a main processor 121 (e.g., a central processing unit or an application processor) and an coprocessor 123 (e.g., a graphic processing device, an image signal processor, a sensor hub processor, or a communication processor), which operates independently from the main processor 121, additionally or alternatively uses less power than the main processor 121, or is specified to a designated function. In this case, the coprocessor 123 may operate separately from the main processor 121 or may be embedded within the same physical chip as main processor 121.

The coprocessor 123 may control, for example, at least some of functions or states associated with at least one component (e.g., the display device 160, the sensor module 176, or the communication module 190) among the components of the electronic device 101 instead of the main processor 121 while the main processor 121 is in an inactive (e.g., sleep) state or together with the main processor 121 while the main processor 121 is in an active (e.g., an application execution) state. According to various embodiments, the coprocessor 123 (e.g., the image signal processor or the communication processor) may be implemented as a part of another component (e.g., the camera module 180 or the communication module 190) that is functionally related to the coprocessor 123. The memory 130 may store a variety of data used by at least one component (e.g., the processor 120 or the sensor module 176) of the electronic device 101, for example, software (e.g., the program 140) and input data or output data with respect to commands associated with the software. The memory 130 may include the volatile memory 132 or the nonvolatile memory 134.

A program 140 may be stored in the memory 130 as software and may include, for example, an operating system 142, a middleware 144, or an application 146.

The input device 150 may be a device for receiving a command or data, which is used for a component (e.g., the processor 120) of the electronic device 101, from an outside (e.g., a user) of the electronic device 101 and may include, for example, a microphone, a mouse, or a keyboard.

The sound output device 155 may be a device for outputting a sound signal to the outside of the electronic device 101 and may include, for example, a speaker used for general purposes, such as multimedia play or recordings play, and a receiver used only for receiving calls. According to certain embodiments, the receiver and the speaker may be either integrally or separately implemented.

The display device 160 may be a device for visually presenting information to the user and may include, for example, a display, a hologram device, or a projector and a control circuit for controlling a corresponding device. According to some embodiments, the display device 160 may include a touch circuitry or a pressure sensor for measuring an intensity of pressure on the touch.

The audio module 170 may convert a sound into an electrical signal and vice versa. According to various embodiments, the audio module 170 may obtain the sound through the input device 150 or may output the sound through an external electronic device (e.g., the electronic device 102 (e.g., a speaker or a headphone)) wired or wirelessly connected to the sound output device 155 or the electronic device 101.

The sensor module 176 may generate an electrical signal or a data value corresponding to an operating state (e.g., power or temperature) inside or an environmental state outside the electronic device 101. The sensor module 176 may include, for example, a gesture sensor, a gyro sensor, a barometric pressure sensor, a magnetic sensor, an accelera-tion sensor, a grip sensor, a proximity sensor, a color sensor, an infrared sensor, a biometric sensor, a temperature sensor, a humidity sensor, or a luminance sensor.

The interface 177 may support communications utilizing a designated protocol connected via a wired or wireless link to the external electronic device (e.g., the electronic device 102). According to certain embodiments, the interface 177 may include, for example, an HDMI (high-definition multimedia interface), a USB (universal serial bus) interface, an SD card interface, or an audio interface.

A connection terminal 178 may include a connector that physically connects the electronic device 101 to the external electronic device (e.g., the electronic device 102), for example, an HDMI connector, a USB connector, an SD card connector, or an audio connector (e.g., a headphone connector).

The haptic module 179 may convert an electrical signal to a mechanical stimulation (e.g., vibration or movement) or an electrical stimulation perceived by the user through tactile or kinesthetic sensations. The haptic module 179 may include, for example, a motor, a piezoelectric element, or an electric stimulator.

The camera module 180 may capture a still image or video. According to some embodiments, the camera module 180 may include, for example, at least one lens, an image sensor, an image signal processor, or a flash.

The power management module 188 may be a module for managing power supplied to the electronic device 101 and may serve as at least a part of a power management integrated circuit (PMIC).

The battery 189 may be a device for supplying power to at least one component of the electronic device 101 and may include, for example, a non-rechargeable (primary) battery, a rechargeable (secondary) battery, or a fuel cell.

The communication module 190 may establish a wired or wireless communication channel between the electronic device 101 and the external electronic device (e.g., the electronic device 102, the electronic device 104, or the server 108) and support communication execution through the established communication channel. The communication module 190 may include at least one communication processor operating independently from the processor 120 (e.g., the application processor) and supporting the wired communication or the wireless communication. According to various embodiments, the communication module 190 may include a wireless communication module 192 (e.g., a cellular communication module, a short-range wireless communication module, or a GNSS (global navigation satellite system) communication module) or a wired communication module 194 (e.g., an LAN (local area network) communication module or a power line communication module) and may communicate with the external electronic device using a corresponding communication module among them through the first network 198 (e.g., the short-range communication network such as Bluetooth, Wi-Fi direct, or an IrDA (infrared data association)) or the second network 199 (e.g., the long-distance wireless communication network such as a cellular network, an internet, or a computer network (e.g., LAN or WAN)). The above-mentioned communication modules 190 may be implemented into one chip or into separate chips, respectively.

According to certain embodiments, the wireless communication module 192 may identify and authenticate the electronic device 101 using user information stored in the subscriber identification module 196 in the communication network.

The antenna module 197 may include one or more antennas to transmit or receive the signal or power to or from an external source. According to some embodiments, the communication module 190 (e.g., the wireless communication module 192) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to various embodiments, the command or data may be transmitted or received between the electronic device 101 and the external electronic device 104 through the server 108 connected to the second network 199. Each of the electronic devices 102 and 104 may be the same or different types as or from the electronic device 101. According to certain embodiments, all or some of the operations performed by the electronic device 101 may be performed by another electronic device or a plurality of external electronic devices. When the electronic device 101 performs some functions or services automatically or by request, the electronic device 101 may request the external electronic device to perform at least some of the functions related to the functions or services, in addition to or instead of performing the functions or services by itself. The external electronic device receiving the request may carry out the requested function or the additional function and transmit the result to the electronic device 101. The electronic device 101 may provide the requested functions or services based on the received result as is or after additionally processing the received result. To this end, for example, a cloud computing, distributed computing, or client-server computing technology may be used.

Figure 2:
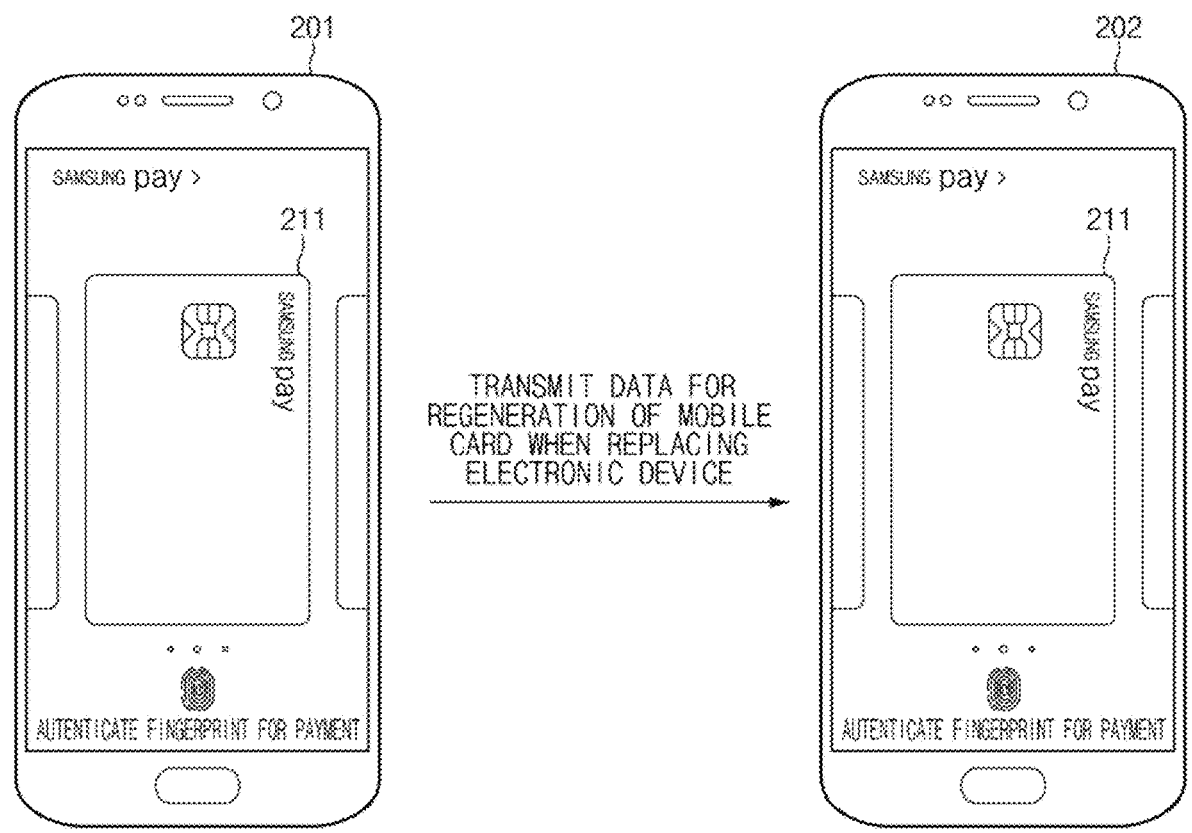
FIG. 2 illustrates an operation environment of an electronic device according to some embodiments.

FIG. 2 illustrates an operation environment of an electronic device according to some embodiments.

Referring to the non-limiting example of FIG. 2, each of first and second electronic devices 201 and 202 may include at least a part of the electronic device 101 of FIG. 1. The first electronic device 201 according to various embodiments may transmit data for regenerating a mobile card 211 stored in the first electronic device 201 to the second electronic device 202. For example, the first electronic device 201 may install a wallet application and the mobile card 211. When installing the mobile card 211, the first electronic device 201 may receive a request for backing up the mobile card 211 from a user. When the backup of the mobile card 211 is requested, the first electronic device 201 may store backup data in a secure element. Even if there is no backup request from a user, the first electronic device 201 may automatically store the backup data in the secure element. When the user desires to install the mobile card 211 into the second electronic device 202 (e.g., when the user replaces the first electronic device 201 with the second electronic device 202), the first electronic device 201 may acquire data for regenerating the mobile card 211 from the backup data and may encrypt the acquired data. The first electronic device 201 may store the encrypted data in a secure zone (e.g., a trust zone). The first electronic device 201 may directly transmit the encrypted data to the second electronic device 202 into which the mobile card 211 is to be installed. The second electronic device 202 may install the mobile card 211 by using the encrypted data. The process of installing the mobile card 211 into the second electronic device 202 may be simplified by transmitting the encrypted data for regenerating the mobile card 211 from the first electronic device 201 to the second electronic device 202.

Figure 3:
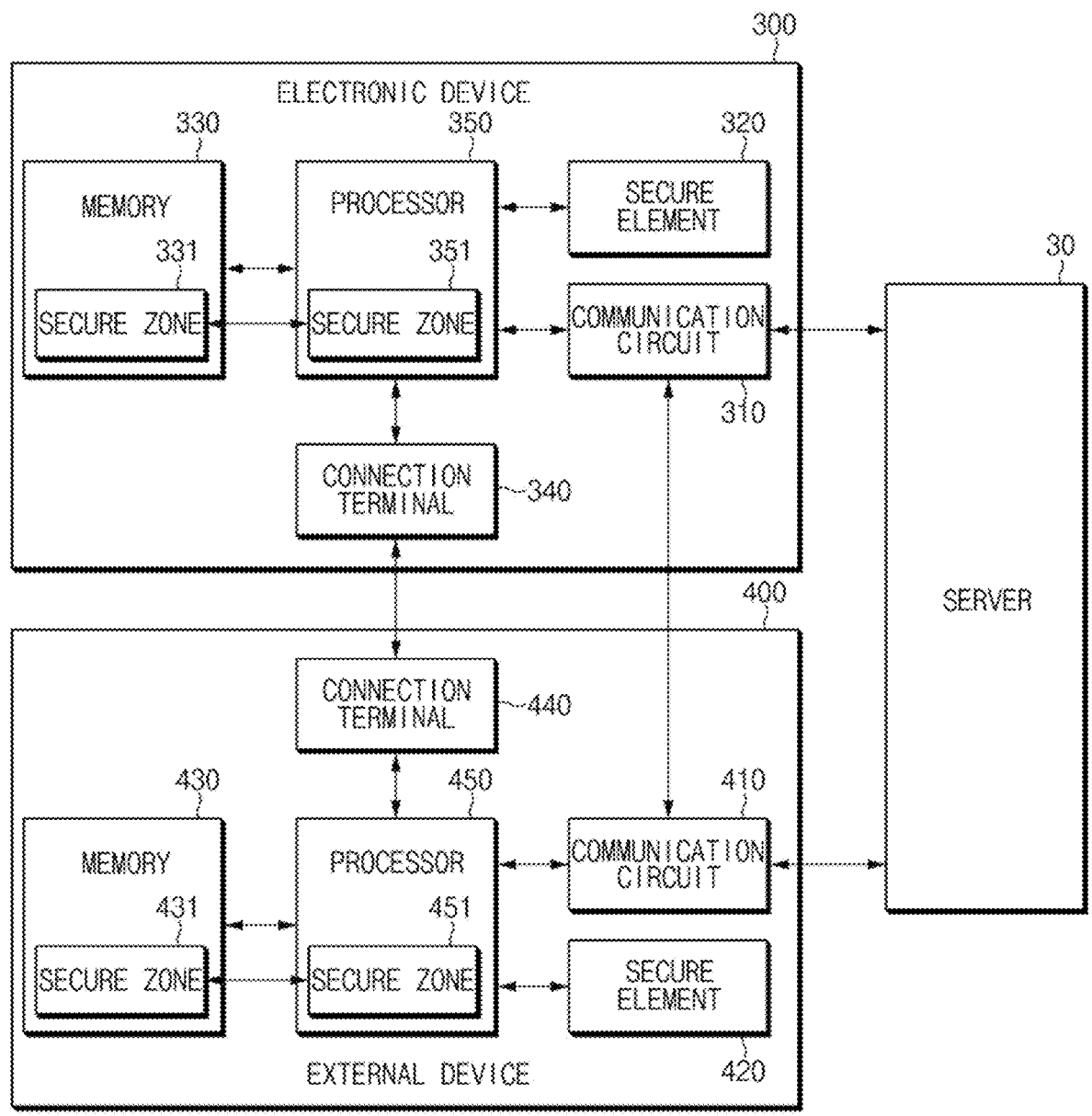
FIG. 3 illustrates, in block diagram format, a configuration of an electronic device according to various embodiments.

FIG. 3 illustrates, in block diagram format, a configuration of an electronic device according to certain embodiments.

Referring to the non-limiting example of FIG. 3, an electronic device 300 according to some embodiments may be connected to a server 30 and an external device 400. The electronic device 300 may include at least a part of the configuration of the electronic device 101 of FIG. 1 and/or the electronic devices 201 and 202 of FIG. 2. According to various embodiments, the electronic device 300 may include a communication circuit 310, a secure element 320, a memory 330, a connection terminal 340, and a processor 350.

The communication circuit 310 may be configured to communicate with the server 30. For example, the communication circuit 310 may communicate with the server 30 through a cellular network, a Wi-Fi network, Internet, a computer network, or the like. The server 30 may be a server for issuing a mobile card. For example, the server 30 may include a server of a service provider and/or a trusted service manager (TSM) server. Although one server 30 is depicted in FIG. 3, embodiments according this disclosure are not limited thereto, and the electronic device 300 may communicate with two or more servers. In addition, a function performed by the server 30 may be performed by two or more servers.

According to certain embodiments, the communication circuit 310 may communicate with the external device 400. For example, the communication circuit 310 may communicate directly with the external device 400 via a short-range communication protocol such as NFC, Bluetooth, Wi-Fi direct, or IrDA.

The secure element 320 may store a mobile card. The secure element 320 may be an access-restricted storage. For example, the secure element 320 may include at least one of an embedded secure element (eSE) or a subscriber identity module (SIM).

The memory 330 may include a volatile memory and/or a non-volatile memory. The memory 330 may store various data used in the electronic device 300. According to some embodiments, the memory 330 may include a secure zone. For example, a secure zone 331 of the memory 330 may be a trust zone.

The connection terminal 340 may include a connector capable of physically connecting the electronic device 300 and the external device 400 such as an HDMI connector, a USB connector, an SD card connector, or an audio connector (e.g., a headphone connector). According to various embodiments, the electronic device 300 may transmit data to the external device 400 through the connection terminal 340.

The processor 350 may be electrically connected to the communication circuit 310, the secure element 320, the memory 330, and/or the connection terminal 340. The processor 350 may control the communication circuit 310, the secure element 320, the memory 330, the connection terminal 340, and the like, and may perform various data processing and operations.

According to certain embodiments, the processor 350 may provision the mobile card. The processor 350 may receive data associated with the mobile card from the server 30 issuing the mobile card and may store the mobile card in the secure element 320.

When provisioning the mobile card, the electronic device 300 may perform the backup of the mobile card as follows.

According to some embodiments, the processor 350 may receive personal data and card data corresponding to the mobile card from the server 30 through the communication circuit 310 or may receive them by using an input device. The personal data may include data required for authentication of a user corresponding to the mobile card. For example, the personal data may include at least one of the name, date of birth, or telephone number of the user of the mobile card. The card data may include data required for installation of the mobile card or data required for payment by the mobile card. The card data may include at least one of a card number, expiration date, card verification value (CVV), or balance of the mobile card.

According to various embodiments, the processor 350 may store the backup data, which include the personal data and the card data to back up the mobile card, in the secure element 320. For example, the processor 350 may generate a backup applet that includes the personal data and the card data, and may store the backup applet in the secure element 320. When a plurality of mobile cards are stored in the electronic device 300, the processor 350 may generate a plurality of backup applets which correspond to the plurality of mobile cards, respectively, and may generate one backup applet for all the mobile cards. The processor 350 may store the mobile card and the backup data in the same element or in different elements. For example, the processor 350 may store the mobile card and the backup data in the eSE. As another example, the processor 350 may store the mobile card in the eSE and may store the backup data in the SIM.

According to certain embodiments, when the data associated with the mobile card is updated, the processor 350 may change the backup data such that the personal data and the card data correspond to the updated data. For example, when the mobile card is deleted, the processor 350 may delete the backup data corresponding to the deleted mobile card. As another example, when the telephone number, expiration date, and the like of the user are updated, the processor 350 may change the backup data to reflect the updated data. As still another example, when the balance of the mobile card is changed, the processor 350 may change the backup data to reflect the changed balance.

As described above, the electronic device 300 may store the backup data of the mobile card. When the user of the electronic device 300 desires to install the mobile card in another device, the electronic device 300 may transmit the backup data to the external device 400 as follows.

According to some embodiments, the processor 350 may obtain the personal data and the card data from the backup data stored in secure element 320 in response to a request from a user of the electronic device 300. When a user of the electronic device 300 desires to transfer the backup data to another device (e.g., the external device 400) or install the mobile card into another device, the processor 350 may receive a request from the user of the electronic device 300 through a user interface. The processor 350 may, in response to the request, access the secure element 320 and confirm whether the backup data is stored in the secure element 320. The processor 350 may read the personal data and the card data from the backup data stored in the secure element 320.

According to various embodiments, when the personal data and the card data are obtained from the backup data, the processor 350 may delete the backup data in the secure element 320. When the personal data and the card data are obtained, the processor 350 may immediately delete the backup data in the secure element 320 to prevent the backup data from being leaked.

According to certain embodiments, the processor 350 may encrypt the personal data and the card data. For example, the processor 350 may receive a password for encrypting the personal data and the card data from the user of the electronic device 300, and may encrypt the personal data and the card data using the received password. As another example, the processor 350 may encrypt the personal data and the card data using other means such as biometric information, a pattern, or the like.

According to some embodiments, the processor 350 may set a time limit to use the encrypted data. For example, the processor 350 may set a time limit to allow the encrypted data to be available only for 24 hours after the data is encrypted, thereby minimizing security problems.

According to various embodiments, the processor 350 may store the obtained personal data and card data in the secure zone 331 of the memory. When the personal data and the card data are encrypted, the processor 350 may store the encrypted data in the secure zone 331 of the memory 330. When the secure zone 331 of the memory 330 is accessed, the work may be performed in a secure zone 351 of the processor 350. For example, the secure zone 351 of the processor 350 may be a trust zone.

According to certain embodiments, the processor 350 may directly transmit the encrypted data to the external device 400. The processor 350 may transmit the encrypted data stored in the secure zone 331 of the memory 330 to the external device 400 by using a backup and restore tool. For example, the processor 350 may directly transmit the encrypted data to the external device 400 by using the communication circuit 310 supporting short-range communication protocols such as Wi-Fi direct, Bluetooth, NFC, or the like. As another example, the processor 350 may directly transmit the encrypted data to the external device 400 through the connection terminal 340. For example, the external device 400 may be a mobile device such as a smartphone, a tablet PC, wearable device, and the like. Although the encrypted data transmitted from the electronic device 300 to the external device 400 is illustrated in FIG. 3, the embodiment is not limited thereto, and the encrypted data may be transferred from the electronic device 300 to a personal terminal of a user such as a desktop computer, a laptop computer, and the like. To prevent data from being leaked, the encrypted data may be directly transmitted to the external device 400 or the personal terminal without passing through the server 30.

The external device 400 may install the mobile card by using the encrypted data as follows. The external device 400 according to some embodiments may include a communication circuit 410, a secure element 420, a memory 430, a connection terminal 440, and/or a processor 450. The communication circuit 410, the secure element 420, the memory 430, the connection terminal 440, and the processor 450 of the external device 400 may be similar to the communication circuit 310, the secure element 320, the memory 330, the connection terminal 340, and the processor 350 of the electronic device 300, respectively.

According to various embodiments, the processor 450 may store the encrypted data received from the electronic device 300. The processor 450 may receive the encrypted data from the electronic device 300 or the personal terminal of the user through the communication circuit 410 or the connection terminal 440. The processor 450 may store the encrypted data in a secure zone (e.g., a trust zone) 431 of the memory 430 through a secure zone (e.g., a trust zone) 451 of the processor 450.

According to certain embodiments, the processor 450 may install a wallet application in the memory 430 and may confirm whether the encrypted data are stored in the secure zone 431 of the memory 430 when the wallet application is executed. The processor 450 may access the secure zone 431 of the memory 430 through the secure zone 451 of the processor 450. To generate the mobile card to perform payment through the wallet application, the processor 450 may confirm whether the encrypted data exist.

According to some embodiments, the processor 450 may decrypt the encrypted data. For example, the processor 450 may receive a password, biometric information or a pattern corresponding to the encrypted data from the user through the user interface and may decrypt the encrypted data stored in the secure zone 431 of the memory 430 by using the password, the biometric information or the pattern. The processor 450 may obtain the personal data and the card data corresponding to the mobile card by decrypting the encrypted data.

According to various embodiments, the processor 450 may receive additional data for generating the mobile card from the server 30 through the communication circuit 410. For example, when the additional data is required for generation of the mobile card, the processor 450 may request the server 30 to transmit the additional data and receive the additional data from the server 30.

According to certain embodiments, the processor 450 may generate the mobile card based on the personal data and the card data. The processor 450 may generate the mobile card by using the personal data and the card data obtained from the data encrypted in a manner similar to that of generating the mobile card by using the data received from the server 30. When the additional data is received, the processor 450 may generate the mobile card based on the personal data, the card data and the additional data.

According to some embodiments, the processor 450 may store the mobile card in the secure element 420. For example, the processor 450 may store the mobile card in the eSE or the SIM.

According to various embodiments, the processor 450 may store the backup data including the personal data and the card data in the secure element 420. For example, the processor 450 may generate the backup applet including the personal data and the card data and may store the backup applet in the secure element 420. The processor 450 may store the mobile card and the backup data in the same element or different elements.

According to certain embodiments, when a request of a user occurs, the processor 450 may generate the encrypted data based on the backup data in order to reinstall the mobile card, and may transmit the encrypted data to another device. The external device 400 may perform the same operation as the electronic device 300.

Figure 4:
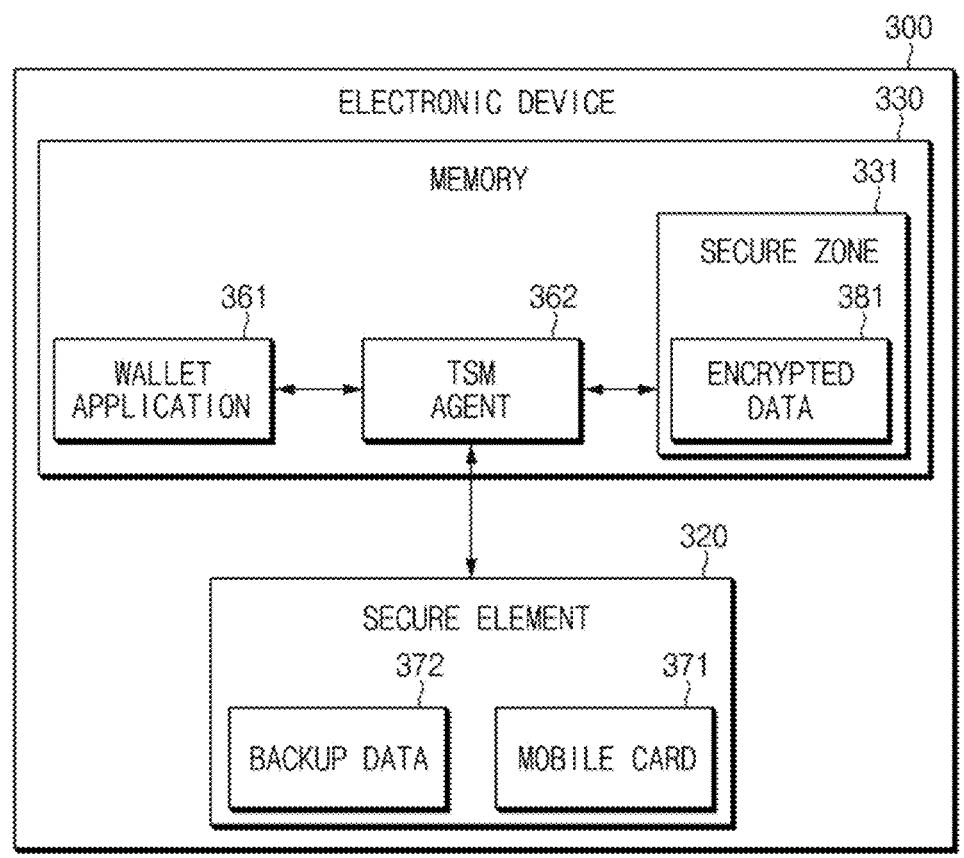
FIG. 4 illustrates, in block diagram format, a program module stored in an electronic device according to certain embodiments.

FIG. 4 illustrates, in block diagram format, a program module stored in an electronic device according to some embodiments.

Referring to the non-limiting example of FIG. 4, the electronic device 300 according to various embodiments may store a wallet application 361, a TSM agent 362, encrypted data 381, backup data 372, and a mobile card 371.

According to certain embodiments, the wallet application 361 and the TSM agent 362 may be stored in the memory 330. The electronic device 300 may install the wallet application 361 and the TSM agent 362 in the memory 330. The processor (e.g., the processor 350 or the processor 450) of the electronic device 300 may execute the wallet application 361 and the TSM agent 362 and may perform various operations by using the wallet application 361 and the TSM agent 362.

According to some embodiments, the electronic device 300 may provision the mobile card 371. For example, when the wallet application 361 is installed, the wallet application 361 may provision the mobile card 371 by using the TSM agent 362. The wallet application 361 may perform user authentication, request the mobile card 371 from a server (e.g., the server 30 of FIG. 3), and install the mobile card 371 through the TSM agent 362. The TSM agent 362 may access the secure element 320 and may store the mobile card 371 in the secure element 320.

According to various embodiments, the electronic device 300 may back up the mobile card 371. For example, when the mobile card 371 is provisioned, the wallet application 361 may provide the user with a user interface to query whether to back up the mobile card 371. When the backup of the mobile card 371 is requested, the wallet application 361 may request the server to back up the mobile card 371. The TSM agent 362 may receive the personal data and the card data corresponding to the mobile card 371 from the server or may directly receive the personal data from the user. The TSM agent 362 may access the secure element 320 and may store the backup data 372 including the personal data and the card data in the secure element 320. For example, the TSM agent 362 may generate the backup applet including the personal data and the card data, and may back up information required to install the mobile card 371 by storing the backup applet in the secure element 320.

According to certain embodiments, the electronic device 300 may generate the encrypted data 381 to transmit the backup data 372 to another device. For example, the TSM agent 362 may read the personal data and the card data from the backup data 372. When obtaining the personal data and the card data, the TSM agent 362 may delete the backup data in the secure element 320. The TSM agent 362 may encrypt the personal data and the card data by using a password, or the like. The TSM agent 362 may access the secure zone 331 of the memory 330 and may store the encrypted data in the secure zone 331 of the memory 330.

According to some embodiments, the electronic device 300 may provision the mobile card 371 by using the encrypted data 381. For example, the wallet application 361 may receive the password through the user interface from the user. The TSM agent 362 may decrypt the encrypted information stored in the secure zone 331 of the memory 330 by using the received password. The TSM agent 362 may provision the mobile card 371 by using the decrypted information. The TSM agent 362 may store the backup data (e.g., a backup applet) 372 including the decrypted information in the secure element 320, thereby backing up the information required to install the mobile card 371 again.

Figure 5:
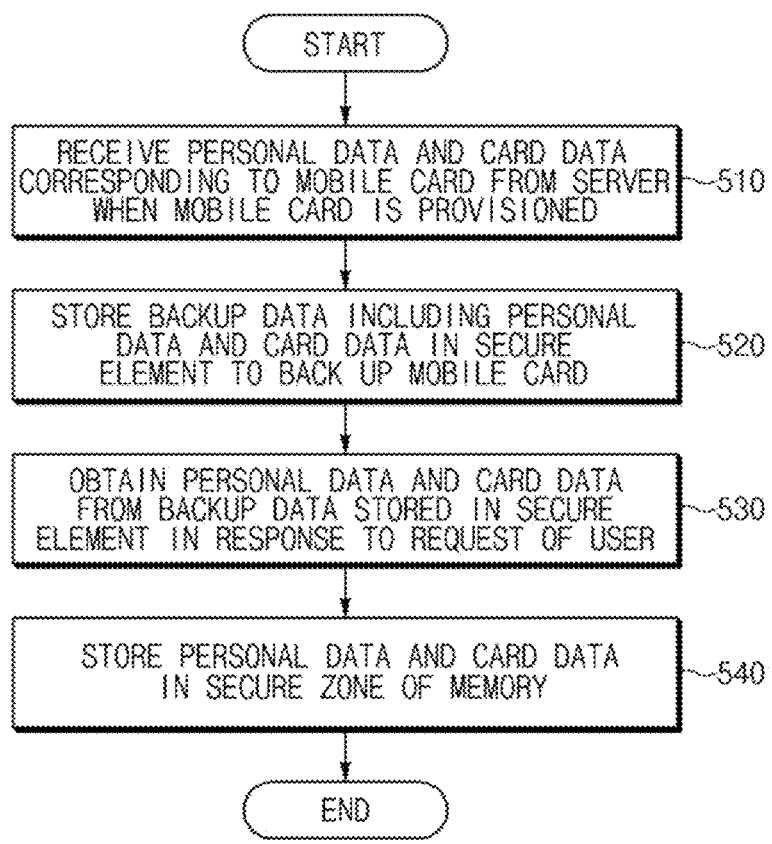
FIG. 5 illustrates operations of a method of backing up a mobile card of an electronic device according to some embodiments.

FIG. 5 illustrates operations of a method of backing up a mobile card of an electronic device according to various embodiments.

Hereinafter, it is assumed that, in the non-limiting example of FIG. 5, the electronic device 300 of FIG. 3 performs the process of FIG. 5. In addition, in the description of FIG. 5, it may be understood that the operation described as being performed by the electronic device is controlled by the processor 350 of the electronic device 300.

Referring to FIG. 5, in operation 510, when the mobile card is provisioned, the electronic device may receive the personal data and the card data corresponding to the mobile card from the server. For example, the electronic device may obtain the data required to re-install the mobile card when provisioning the mobile card in order to simplify the process of reinstalling the mobile card when the user replaces the electronic device.

In operation 520, the electronic device may store the backup data including the personal data and the card data in the secure element in order to back up the mobile card. For example, the electronic device may generate the backup data including data required to re-install the mobile card and may store the generated backup data in the secure element.

In operation 530, the electronic device may obtain the personal data and the card data from the backup data stored in the secure element in response to a request of the user. For example, when the user requests the electronic device to transmit the backup data in order to re-install the mobile card in another device, the electronic device may read out the personal data and the card data from the backup data.

In operation 540, the electronic device may store the personal data and the card data in the secure zone of the memory. For example, the electronic device may encrypt the personal data and the card data and may store the encrypted data in the trust zone. The electronic device may transmit the encrypted data to another device.

Figure 6:
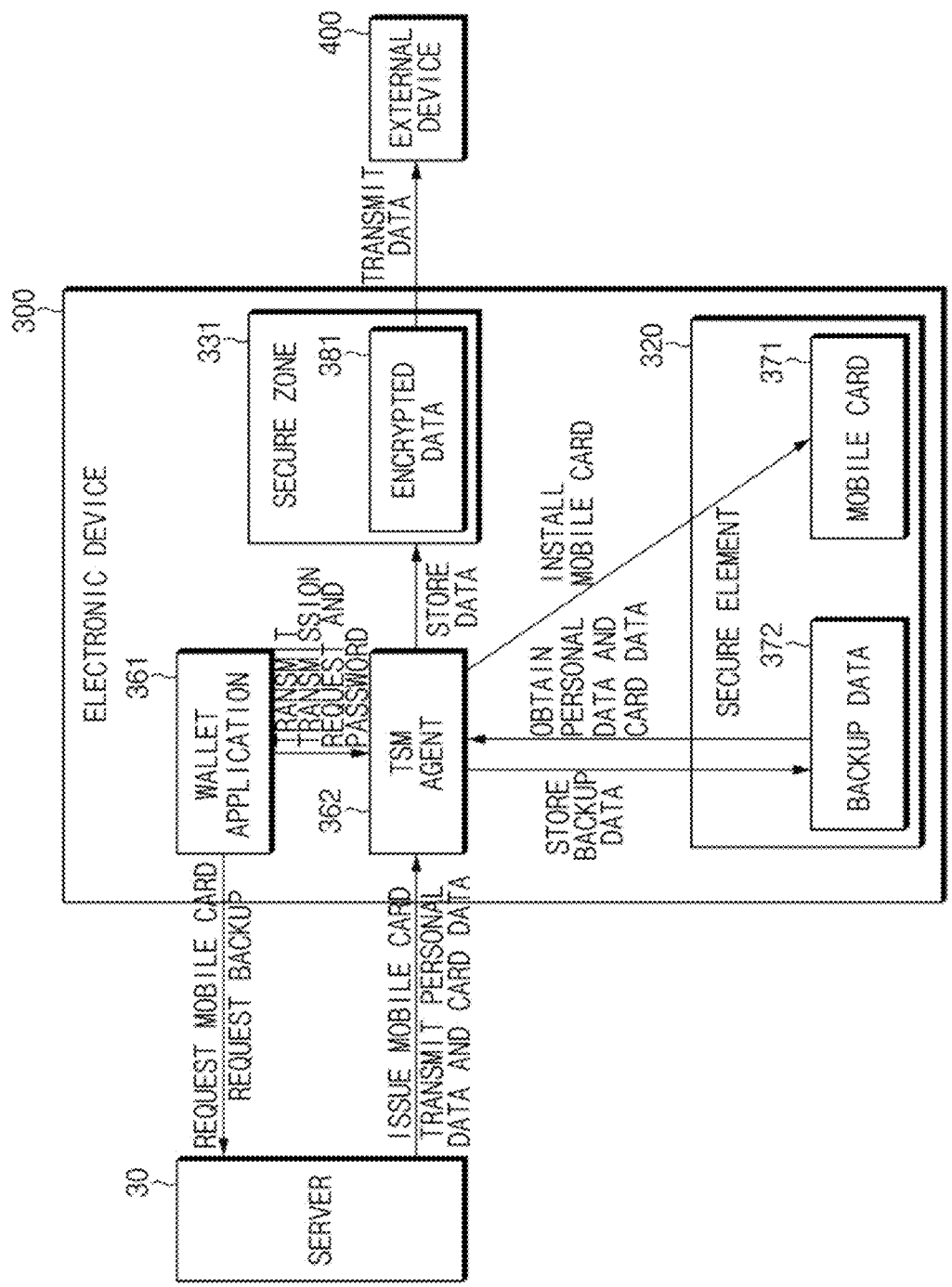
FIG. 6 illustrates, in block diagram format, a program module stored in an electronic device according to various embodiments.
Figure 7:
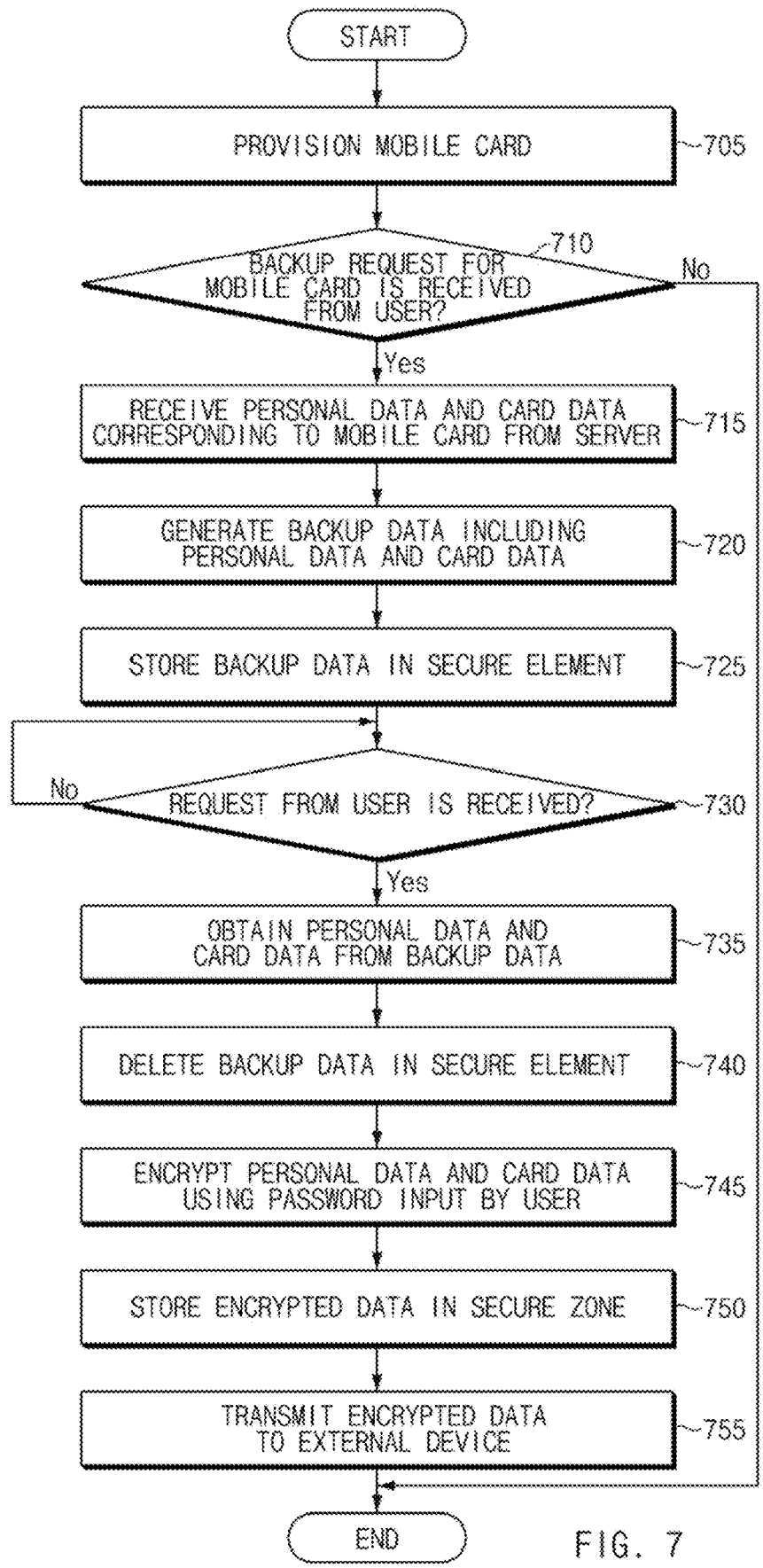
FIG. 7 illustrates operations of a method of backing up a mobile card of an electronic device according to certain embodiments.

FIG. 6 illustrates, in block diagram format, a program module stored in an electronic device according to certain embodiments. FIG. 7 is a flowchart illustrating a method of backing up a mobile card of an electronic device according to some embodiments. Hereinafter, operations of backing up a mobile card will be described with reference to the non-limiting examples of FIGS. 6 and 7.

Referring to FIGS. 6 and 7, in operation 705, the electronic device 300 may provision the mobile card 371. For example, the wallet application 361 may request the mobile card 371 from the server 30. The TSM agent 362 may receive the mobile card 371 issued by the server 30. The TSM agent 362 may access the secure element 320 and install the mobile card 371 into the secure element 320.

In operation 710, the electronic device 300 may determine whether a request for backing up the mobile card 371 is received from the user. For example, the wallet application 361 may provide the user with the user interface for receiving the request for backing up the mobile card 371 through an output device such as a display or the like. When receiving the backup request through the user interface, the electronic device 300 may perform the following operations. Operation 710, which is a selective operation, may be omitted and the electronic device 300 may automatically perform operations 715 to 755 when the mobile card 371 is provisioned.

In operation 715, the electronic data may receive the personal data and the card data corresponding to the mobile card 371 from the server 30. For example, the wallet application 361 may request the server 30 to back up the mobile card 371. The TSM agent 362 may receive the personal data and the card data corresponding to the mobile card 371 from the server 30.

In operation 720, the electronic device 300 may generate the backup data 372 including the personal data and the card data. For example, the TSM agent 362 may generate the backup applet by using the personal data and the card data received from the server 30.

In operation 725, the electronic device 300 may store the backup data 372 in the secure element 320. For example, the TSM agent 362 may access the secure element 320. The TSM agent 362 may install the generated backup applet into the secure element 320.

In operation 730, the electronic device 300 may determine whether the request for transmitting the backup data 372 to another device from the user is received. For example, the wallet application 361 may provide the user with the user interface for receiving the request for transmitting the backup data 372 through an output device such as a display or the like. The wallet application 361 may transfer the transmission request received through the user interface to the TSM agent 362. When receiving the transmission request, the electronic device 300 may perform the following operations.

In operation 735, the electronic device 300 may obtain the personal data and the card data from the backup data 372. For example, the TSM agent 362 may access the secure element 320, and may read out the personal data and the card data, which are required to install the mobile card 371, from the backup data 372 in the secure element 320.

In operation 740, the electronic device 300 may delete the backup data 372 in the secure element 320. For example, after reading out the personal data and the card data, the TSM agent 362 may immediately delete the backup data 372 in the secure element 320 to prevent the backup data 372 from being leaked. When deleting the backup data 372, the TSM agent 362 may delete the mobile card 371 by using an application ID (AID) and app package information.

In operation 745, the electronic device 300 may encrypt the personal data and the card data by using the password input by the user. For example, the wallet application 361 may receive the password through the user interface from the user. The wallet application 361 may transmit the received password to the TSM agent 362. The TSM agent 362 may encrypt the personal data and the card data by using the password. As well as the password, the biometric information, the pattern, or the like may be used to encrypt data. The TSM agent 362 may set a time limit to decrypt the encrypted data.

In operation 750, the electronic device 300 may store the encrypted data 381 in the secure zone 331. For example, the TSM agent 362 may store the encrypted data 381 in the trust zone.

In operation 755, the electronic device 300 may transmit the encrypted data 381 to the external device 400. For example, the electronic device 300 may directly transmit the encrypted data 381 to the external device 400, which is a personal terminal of the user, by using the backup and restoring functions.

Figure 8:
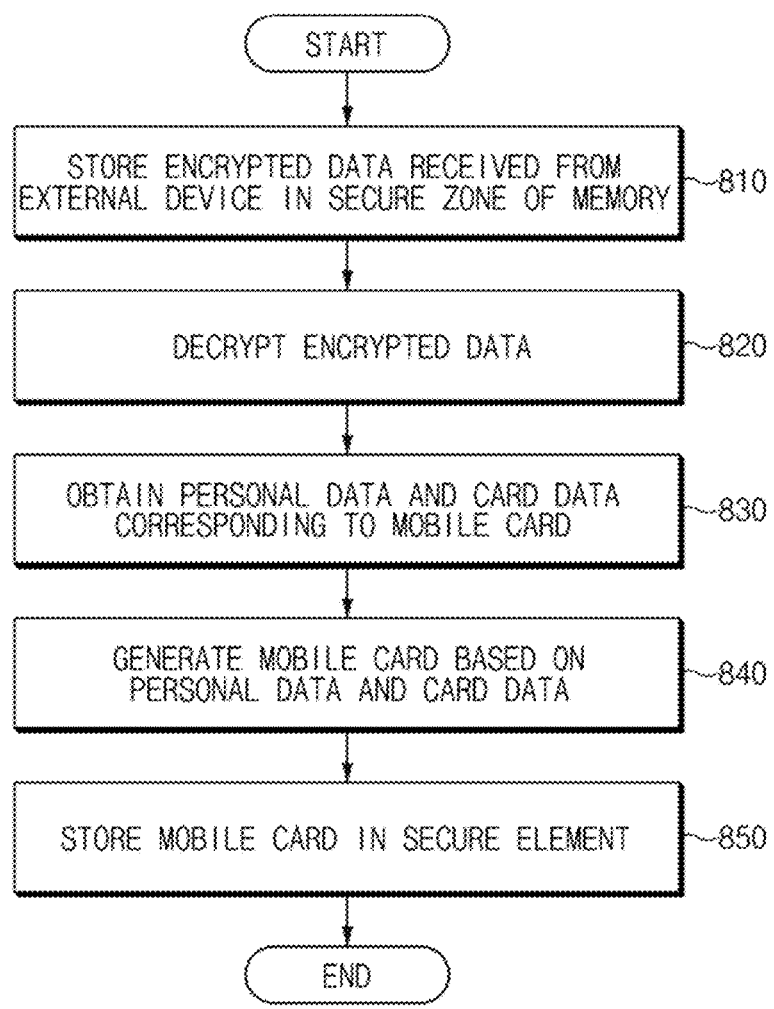
FIG. 8 illustrates operations of a method of reinstalling a mobile card of an electronic device according to some embodiments.

FIG. 8 illustrates operations of a method of reinstalling a mobile card of an electronic device according to various embodiments.

Hereinafter, it is assumed that in the non-limiting example of FIG. 8, the external device (hereinafter, which is referred to as an electronic device for convenience of description) 400 of FIG. 3 performs the process of FIG. 8. In addition, in the description of FIG. 8, it will be appreciated that the operation described as being performed by the electronic device is controlled by the processor 450 of the external device 400.

Referring to FIG. 8, in operation 810, an electronic device may store the encrypted data received from an external device (e.g., the electronic device 300 of FIG. 3) in the secure zone of a memory. For example, the electronic device may be connected via a wired or wireless connection to the external device. The electronic device may receive the encrypted data from the connected external device and store the received data in the trust zone.

In operation 820, the electronic device may decrypt the encrypted data. For example, when a user desires to re-install a mobile card, the electronic device may receive a password, biometric information, a pattern, and the like corresponding to the encrypted data from the user. The electronic device may decrypt the encrypted data by using the password, the biometric information, the pattern, and the like.

In operation 830, the electronic device may obtain the personal data and the card data corresponding to the mobile card. For example, the electronic device may obtain the personal data and the card data for reinstallation of the mobile card by decrypting the encrypted data.

In operation 840, the electronic device may generate the mobile card based on the personal data and the card data. For example, the electronic device may generate the mobile card by using the personal data and the card data backed up by simply entering a password without complicated procedures such as user authentication, card information input, card verification, agreement of terms, security code registration, and the like.

In operation 850, the electronic device may store the mobile card in the secure element. The electronic device may perform card transaction by using the stored mobile card.

Figure 9:
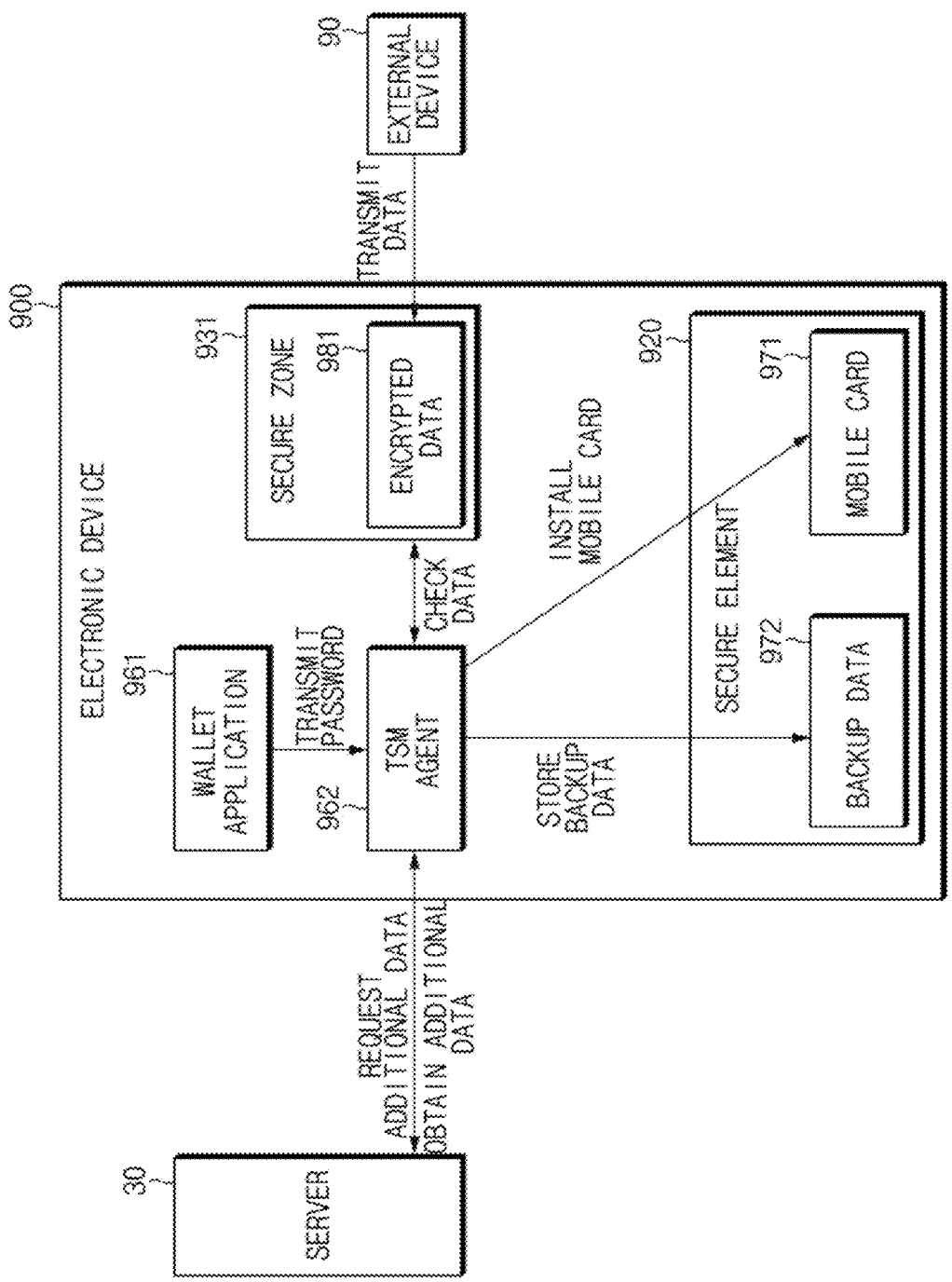
FIG. 9 illustrates, in block diagram format, an operation of a program module stored in an electronic device according to various embodiments.
Figure 10:
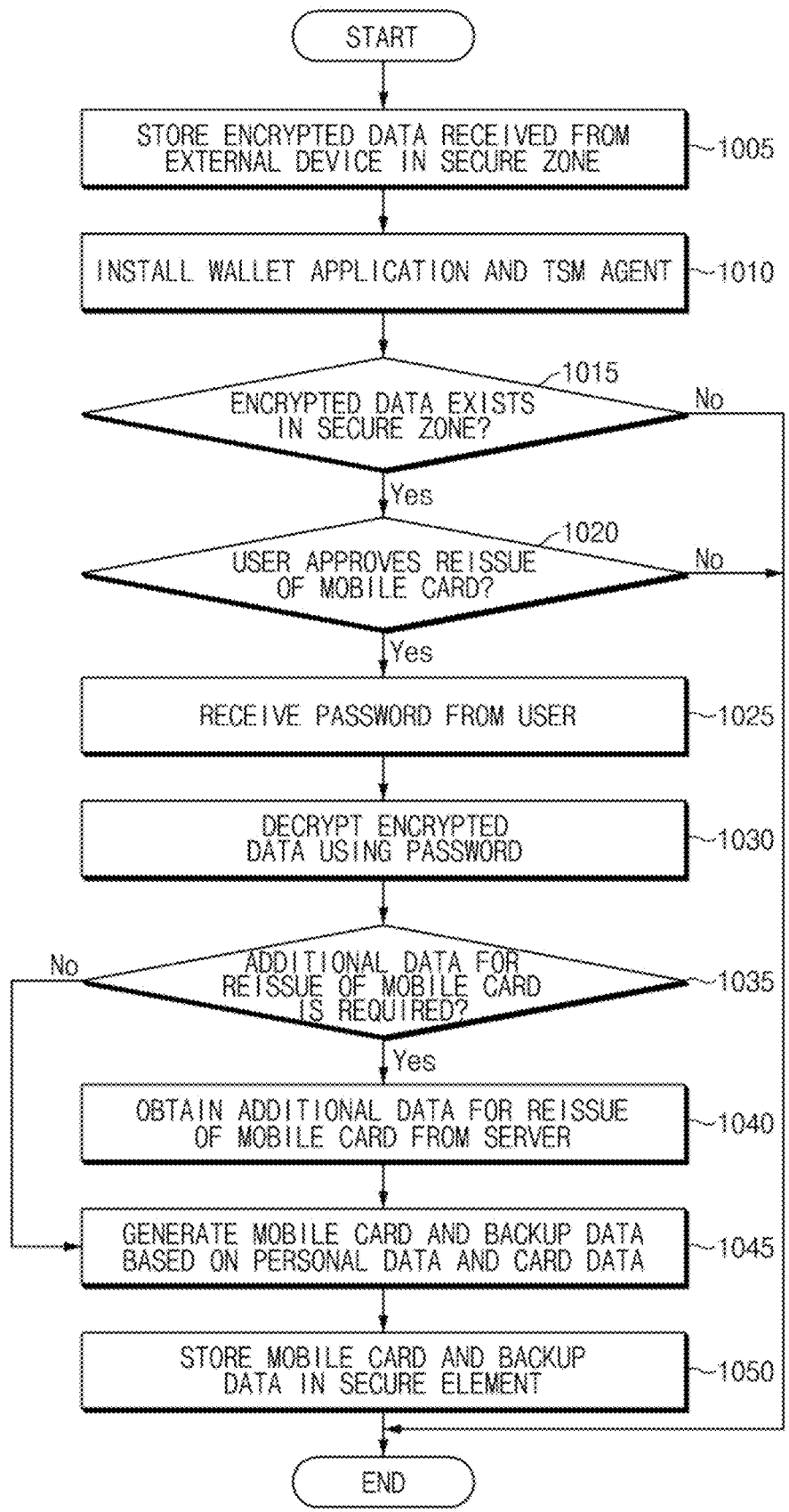
FIG. 10 illustrates operations of a method of reinstalling a mobile card of an electronic device according to certain embodiments.

FIG. 9 illustrates, in block diagram format, operations of a program module stored in an electronic device according to certain embodiments. FIG. 10 illustrates operations of a method of reinstalling a mobile card of an electronic device according to some embodiments. An electronic device 900 of FIG. 9 may be the external device 400 of FIG. 3. An external device 90 of FIG. 9 may, for the purposes of the non-limiting examples shown in FIGS. 9 and 10, be the electronic device 300 of FIG. 3. Hereinafter, operations of reissuing a mobile card will be described with reference to FIGS. 9 and 10.

Referring to FIGS. 9 and 10, in operation 1005, the electronic device 900 may store encrypted data 981 received from the external device 90 in a secure zone 931. For example, the electronic device 900 may receive the data 981 encrypted by using backup and restoring functions from the external device 90 which is a personal terminal of a user, and store the encrypted data 981 in the secure zone 931.

In operation 1010, the electronic device 900 may install a wallet application 961 and a TSM agent 962. For example, the electronic device 900 may install the wallet application 961 and the TSM agent 962 which are downloaded to use a mobile card 971 to be reissued.

In operation 1015, the electronic device 900 may determine whether the encrypted data 981 exist in a trust zone. For example, the TSM agent 962 may access the trust zone and confirm whether the encrypted data 981 associated with the mobile card 971 exist. When the encrypted data 981 exist, the electronic device 900 may perform following operations.

In operation 1020, the electronic device 900 may obtain approval to reissue of the mobile card 971 from a user. For example, the wallet application 961 provide a user with a user interface for receiving a request for reissuing the mobile card 971 through an output device such as a display or the like. When the reissue is approved by the user, the electronic device 900 may perform following operations.

In operation 1025, the electronic device 900 may receive the password from the user. For example, the wallet application 961 may receive the password from the user through the user interface.

In operation 1030, the electronic device 900 may decrypt the encrypted data 981 by using the password. For example, the wallet application 961 may transmit the received password to the TSM agent 962. The TSM agent 962 may decrypt the encrypted data 981 by using the transmitted password. In addition to the password, the biometric information, the pattern, or the like may be used for the data decryption.

In operation 1035, the electronic device 900 may determine whether additional data is required to reissue the mobile card 971. For example, when there are the additional data required for reissuing the mobile card 971 as well as the personal data and the card data decrypted, the TSM agent 962 may request the additional data from the server 30.

In operation 1040, the electronic device 900 may obtain the additional data for reissuing the mobile card 971 from the server 30. For example, the TSM agent 962 may obtain the additional data transmitted by the server 30 in response to the request.

In operation 1045, the electronic device may generate the mobile card 971 and backup data 972 based on the personal data and the card data. For example, the TSM agent 962 may access a secure element 920 and install the mobile card 971 into the secure element 920 by using the personal data and the card data. In operation 1040, when obtaining the additional data, the TSM agent 962 may install the mobile card 971 in the secure element 920 by using the personal data, the card data and the additional data. When the card data include balance information, the balance information may be updated when the mobile card 971 is installed.

In operation 1050, the electronic device 900 may store the mobile card 971 and the backup data 972 in the secure element 920. For example, the TSM agent 962 may store the backup data 972 in a manner similar to operation 725. When the request of the user exists, the electronic device 900 may perform operations 730 to 755 by using the backup data 972.

Figure 11:
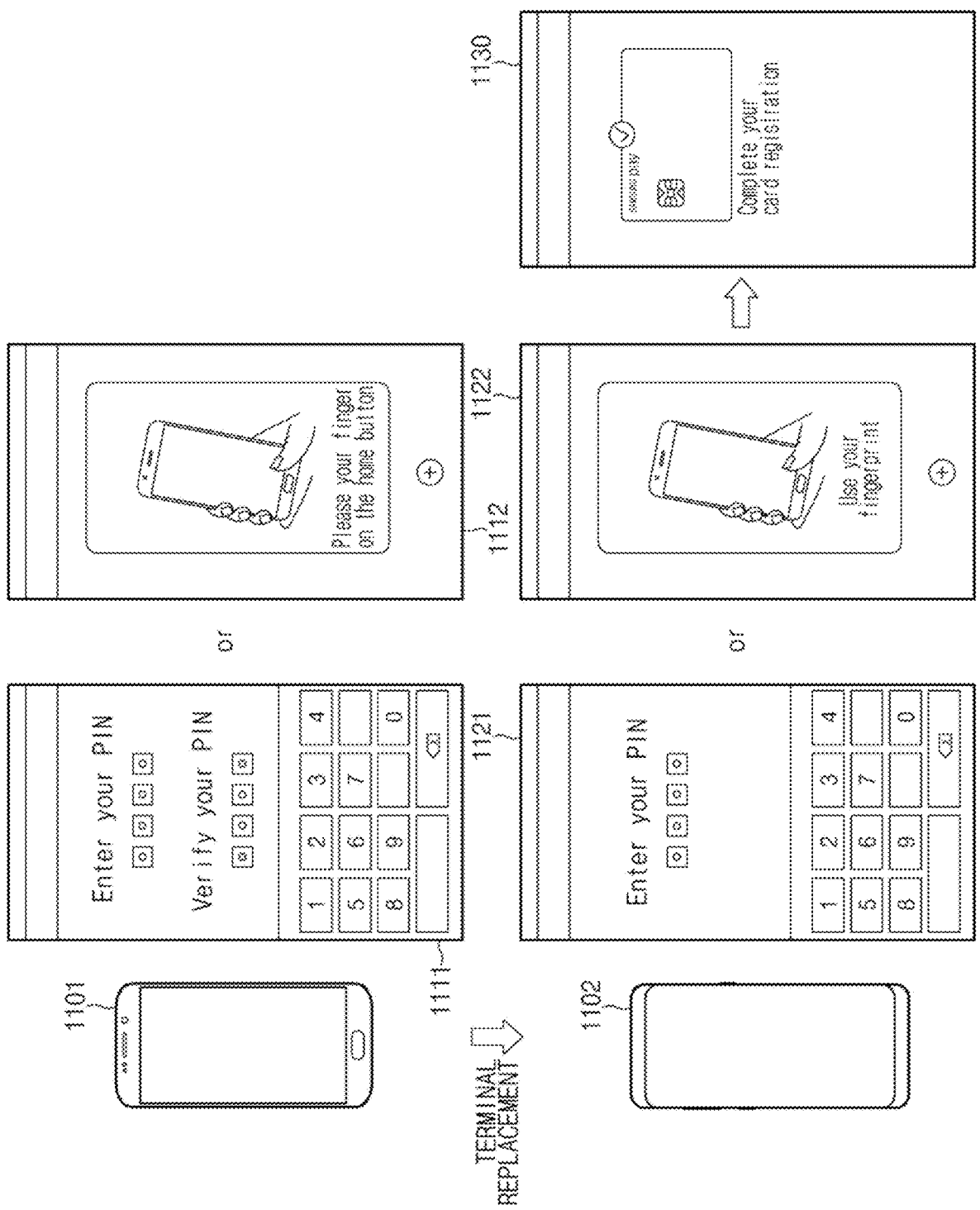
FIG. 11 illustrates views of a user interface provided by an electronic device according to some embodiments.

FIG. 11 illustrates views of a user interface provided by an electronic device according to various embodiments.

For example, a user interface illustrated in FIG. 11 may be provided by the electronic device 101, the first and second electronic devices 201 and 202, the electronic device 300, the external device 400, the electronic device 900, or the like.

Referring to FIG. 11, a first electronic device 1101 according to certain embodiments may provision a mobile card. When provisioning the mobile card, the first electronic device 1101 may obtain a PIN or a fingerprint to be used when the mobile card is re-installed. The first electronic device 1101 may output a first image 1111 for obtaining the PIN and a second image 1112 for obtaining the fingerprint. The first image 1111 may include a PIN field, a PIN check field, and a keypad for inputting the PIN. The second image 1112 may include a message for inducing a user to input the fingerprint. The first electronic device 1101 may store the PIN or fingerprint obtained.

The user may replace the first electronic device 1101 with a second electronic device 1102. The PIN or fingerprint stored in the first electronic device 1101 may be transmitted to the second electronic device 1102. The second electronic device 1102 may reinstall the mobile card installed into the first electronic device 1101. The second electronic device 1102 may obtain the PIN or fingerprint for authentication when installing the mobile card. The second electronic device 1102 may output a third image 1121 for obtaining the PIN or a fourth image 1122 for obtaining the fingerprint. The third image 1121 may include a PIN input field and a keypad for inputting the PIN. The fourth image 1122 may include a message for inducing the user to input the fingerprint. When the obtained PIN or fingerprint matches the stored PIN or fingerprint, the second electronic device 1102 may re-install the mobile card. When the re-installation of the mobile card is completed, the second electronic device 1102 may output a fifth image 1130 including a message for informing that the re-installation of the mobile card is completed.

The electronic device according to various embodiments of the present disclosure may be embodied on various types of devices. The electronic device may include, for example, at least one of a portable communication device (e.g., a smartphone), a computer device, a portable multimedia device, a mobile medical appliance, a camera, a wearable device, or a home appliance. The electronic device according to some embodiments of the present disclosure should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the present disclosure may be implemented by software (e.g., the program 140) including an instruction stored in a machine-readable storage media (e.g., an internal memory 136 or an external memory 138) readable by a machine (e.g., a computer). The machine may be a device that calls the instruction from the machine-readable storage media and operates depending on the called instruction and may include the electronic device (e.g., the electronic device 101). When the instruction is executed by the processor (e.g., the processor 120), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to various embodiments, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a PLAY STORE™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:
1. An electronic device comprising:
a communication circuit;
a secure element;
a memory including a secure zone; and
a processor electrically connected to the communication circuit, the secure element, and the memory, wherein the processor is configured to:
provision a mobile card,
when the mobile card is provisioned, receive, from a server for issuing the mobile card using the communication circuit, personal data and card data,
store, in the secure element, backup data including the personal data and the card data for backing up the mobile card,
obtain the personal data and the card data from the backup data stored in the secure element in response to receiving an input for requesting a transmission of the backup data to another electronic device,
delete the backup data in the secure element with deleting the mobile card in response to obtaining the personal data and the card data from the backup data,
receive a password for encrypting the personal data and the card data,
encrypt the personal data and the card data using the password,
store the encrypted data in the secure zone of the memory, and
transmit the encrypted data to the another electronic device, wherein the personal data is used for authentication of a user corresponding to the mobile card and the card data is used for payment by the mobile card.

2. The electronic device of claim 1, wherein the processor is configured to: generate an applet including the personal data and the card data, and store the applet in the secure element to back up the mobile card.

3. The electronic device of claim 1, wherein the memory stores a wallet application and a trusted service manager (TSM) agent, and wherein the processor is configured to:
execute the wallet application,
after executing the wallet application, receive the personal data and the card data from the server using the TSM agent, and store the backup data in the secure element using the TSM agent.

4. The electronic device of claim 1, wherein the personal data includes at least one of a name, date of birth or telephone number of the user corresponding to the mobile card, and wherein the card data includes at least one of a card number, expiration date, card verification value (CVV), or balance of the mobile card.

5. The electronic device of claim 1, wherein the processor is configured to: when data associated with the mobile card is updated, change the backup data such that the personal data and the card data correspond to the updated data.

6. The electronic device of claim 1, wherein the secure element includes at least one of an embedded secure element (eSE) or a subscriber identity module (SIM).

7. The electronic device of claim 1, wherein the secure zone includes a trust zone.

8. The electronic device of claim 1, wherein the processor is configured to:
set a time limit to use the encrypted data.

9. A method of backing up and reinstalling a mobile card of an electronic device, the method comprising:
provisioning a mobile card;
receiving, from a server for issuing the mobile card, personal data and card data;
storing, in a secure element of the electronic device, backup data including the personal data and the card data for backing up the mobile card;
obtaining the personal data and card data from the backup data stored in the secure element in response to receiving an input for requesting a transmission of the backup data to another electronic device;
deleting the backup data in the secure element with deleting the mobile card in response to obtaining the personal data and the card data from the backup data;
receiving a password for encrypting the personal data and the card data;
encrypting the personal data and the card data using the password;
storing the encrypted data in a secure zone of a memory of the electronic device; and
transmitting the encrypted data to the other electronic device, wherein the personal data is used for authentication of a user corresponding to the mobile card and the card data is used for payment by the mobile card.

10. The method of claim 9, further comprising: generating an applet including the personal data and the card data; and storing the applet in the secure element to back up the mobile card.

11. The method of claim 9, wherein the memory stores a wallet application and a trusted service manager (TSM) agent, and further comprising: executing the wallet application; receiving the personal data and the card data from the server using the TSM agent; and storing the backup data in the secure element using the TSM agent.

12. The method of claim 9, wherein the personal data includes at least one of a name, date of birth or telephone number of the user of the mobile card, and wherein the card data includes at least one of a card number, expiration date, card verification value (CVV), or balance of the mobile card.

13. The method of claim 9, further comprising: in response to data associated with the mobile card being updated, changing the backup data such that the personal data and the card data correspond to the updated data.

14. The method of claim 9, wherein the secure element includes at least one of an embedded secure element (eSE) or a subscriber identity module (SIM).

15. The method of claim 9, wherein the secure zone includes a trust zone.

16. The method of claim 9, further comprising: setting a time limit to use the encrypted data.

* * * * *